United States Patent
Falco

(10) Patent No.: US 11,609,717 B2
(45) Date of Patent: *Mar. 21, 2023

(54) SYSTEM AND METHOD FOR RARE COPY-ON-WRITE IN A DISTRIBUTED COMPUTING ENVIRONMENT

(71) Applicant: Oracle International Corporation, Redwood Shores, CA (US)

(72) Inventor: Mark Falco, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,161

(22) Filed: Oct. 5, 2021

(65) Prior Publication Data
US 2022/0027052 A1 Jan. 27, 2022

Related U.S. Application Data

(63) Continuation of application No. 15/200,908, filed on Jul. 1, 2016, now Pat. No. 11,163,498.
(Continued)

(51) Int. Cl.
*G06F 3/06* (2006.01)
*H04L 67/1095* (2022.01)

(52) U.S. Cl.
CPC .............. *G06F 3/067* (2013.01); *G06F 3/061* (2013.01); *G06F 3/065* (2013.01); *H04L 67/1095* (2013.01)

(58) Field of Classification Search
None
See application file for complete search history.

(56) References Cited

U.S. PATENT DOCUMENTS 5,784,569 A  7/1998 Miller
5,819,272 A  10/1998 Benson
(Continued)

FOREIGN PATENT DOCUMENTS

EP  0928089  7/1999

OTHER PUBLICATIONS

Jameela Al-Jaroodi et al., "Middleware Infrastructure for Parallel and Distributed Programming Models in Hetergeneous Systems" (2003). CSE Journal Articles, 13 pages, retrieved Jan. 21, 2016 from: <http://digitalcommons.unl.edu/cgi/viewcontent.cgi?article=1066&context=csearticles>.
(Continued)

*Primary Examiner* — Sanjiv Shah
*Assistant Examiner* — Alexander J Yoon
(74) *Attorney, Agent, or Firm* — Tucker Ellis LLP

(57) ABSTRACT

A distributed computing environment is provided with a system and method for supporting rare copy-on-write data access. The system operates a data structure in a read only pattern suitable for serving a plurality of read requests with reduced overhead. The system, upon receiving a write request, creates a copy of data to execute the write request. The system defers writing the mutated data back to the read-only data structure. The system thus allows for multiple mutations to be made to the copy of the data using a read/write access pattern. After a number of read-only requests are received, the mutated data is written back to the read-only data structure. A monitor counts read and write requests in order to reduce overall read/write overhead and enhance performance of the distributed data grid.

18 Claims, 3 Drawing Sheets

Related U.S. Application Data

(60) Provisional application No. 62/187,538, filed on Jul. 1, 2015.

(56) References Cited

U.S. PATENT DOCUMENTS

| | | | |
|---|---|---|---|
| 5,940,367 | A | 8/1999 | Antonov |
| 5,991,894 | A | 11/1999 | Lee |
| 5,999,712 | A | 12/1999 | Moiin |
| 6,182,139 | B1 | 1/2001 | Brendel |
| 6,377,993 | B1 | 4/2002 | Brandt |
| 6,487,622 | B1 | 11/2002 | Coskrey |
| 6,490,620 | B1 | 12/2002 | Ditmer |
| 6,553,389 | B1 | 4/2003 | Golding |
| 6,615,258 | B1 | 9/2003 | Barry |
| 6,631,402 | B1 | 10/2003 | Devine |
| 6,693,874 | B1 | 2/2004 | Shaffer |
| 6,714,979 | B1 | 3/2004 | Brandt |
| 6,952,758 | B2 | 10/2005 | Chron |
| 6,968,571 | B2 | 11/2005 | Devine |
| 7,114,083 | B2 | 9/2006 | Devine |
| 7,139,925 | B2 | 11/2006 | Dinker |
| 7,260,698 | B2 | 8/2007 | Hepkin |
| 7,266,822 | B1 | 9/2007 | Boudnik |
| 7,328,237 | B1 | 2/2008 | Thubert |
| 7,376,953 | B2 | 5/2008 | Togasaki |
| 7,464,378 | B1 | 12/2008 | Limaye |
| 7,543,046 | B1 | 6/2009 | Champagne |
| 7,698,390 | B1 | 4/2010 | Harkness |
| 7,720,971 | B2 | 5/2010 | Moutafov |
| 7,739,677 | B1 | 6/2010 | Kekre |
| 7,792,977 | B1 | 9/2010 | Brower |
| 7,814,248 | B2 | 10/2010 | Fong |
| 7,882,067 | B2 | 2/2011 | Saika |
| 7,953,861 | B2 | 5/2011 | Yardley |
| 8,195,835 | B2 | 6/2012 | Ansari |
| 8,209,307 | B2 | 6/2012 | Erofeev |
| 8,312,439 | B2 | 11/2012 | Kielstra |
| 8,397,227 | B2 | 3/2013 | Fan |
| 8,402,464 | B2 | 3/2013 | Dice |
| 8,595,714 | B1 | 11/2013 | Hamer |
| 9,609,060 | B2 | 3/2017 | Kan |
| 11,163,498 | B2 | 11/2021 | Falco |
| 2002/0035559 | A1 | 3/2002 | Crowe |
| 2002/0073223 | A1 | 6/2002 | Darnell |
| 2002/0078312 | A1 | 6/2002 | Wang-Knop |
| 2003/0023898 | A1 | 1/2003 | Jacobs |
| 2003/0046286 | A1 | 3/2003 | Jacobs |
| 2003/0120715 | A1 | 6/2003 | Johnson |
| 2003/0187927 | A1 | 10/2003 | Winchell |
| 2003/0191795 | A1 | 10/2003 | Bernardin |
| 2004/0024973 | A1 | 2/2004 | Chron |
| 2004/0059805 | A1 | 3/2004 | Dinker |
| 2004/0153615 | A1 | 8/2004 | Koning |
| 2004/0179471 | A1 | 9/2004 | Mekkittikul |
| 2004/0205148 | A1 | 10/2004 | Bae |
| 2004/0267897 | A1 | 12/2004 | Hill |
| 2005/0021737 | A1 | 1/2005 | Ellison |
| 2005/0083834 | A1 | 4/2005 | Dunagan |
| 2005/0097185 | A1 | 5/2005 | Gibson |
| 2005/0097294 | A1 | 5/2005 | Hepkin |
| 2005/0138460 | A1 | 6/2005 | McCain |
| 2005/0193056 | A1 | 9/2005 | Schaefer |
| 2006/0095573 | A1 | 5/2006 | Carle |
| 2007/0016822 | A1 | 1/2007 | Rao |
| 2007/0118693 | A1 | 5/2007 | Brannon |
| 2007/0140110 | A1 | 6/2007 | Kaler |
| 2007/0174160 | A1 | 7/2007 | Solberg |
| 2007/0198605 | A1 | 8/2007 | Saika |
| 2007/0237072 | A1 | 10/2007 | Scholl |
| 2007/0260714 | A1 | 11/2007 | Kalmuk |
| 2007/0271584 | A1 | 11/2007 | Anderson |
| 2008/0077622 | A1 | 3/2008 | Keith |
| 2008/0276231 | A1 | 11/2008 | Huang |
| 2008/0281959 | A1 | 11/2008 | Robertson |
| 2009/0031292 | A1* | 1/2009 | Fulton .................. G06F 9/4493 717/151 |
| 2009/0144714 | A1 | 6/2009 | Fan |
| 2009/0265449 | A1 | 10/2009 | Krishnappa |
| 2009/0320005 | A1 | 12/2009 | Toub |
| 2010/0064341 | A1 | 3/2010 | Aldera |
| 2010/0128732 | A1 | 5/2010 | Jiang |
| 2010/0211931 | A1 | 8/2010 | Levanoni |
| 2010/0312861 | A1 | 12/2010 | Kolhi |
| 2011/0041006 | A1 | 2/2011 | Fowler |
| 2011/0071981 | A1 | 3/2011 | Ghosh |
| 2011/0107135 | A1 | 5/2011 | Andrews |
| 2011/0161289 | A1 | 6/2011 | Pei |
| 2011/0178997 | A1* | 7/2011 | Johnson .................. G06F 16/13 707/694 |
| 2011/0179231 | A1 | 7/2011 | Roush |
| 2011/0249552 | A1 | 10/2011 | Stokes |
| 2011/0252192 | A1 | 10/2011 | Busch |
| 2012/0117157 | A1 | 5/2012 | Ristock |
| 2012/0158650 | A1 | 6/2012 | Andre |
| 2012/0215740 | A1 | 8/2012 | Vaillant |
| 2012/0254118 | A1 | 10/2012 | Shah |
| 2012/0297056 | A1 | 11/2012 | Lee |
| 2013/0047165 | A1 | 2/2013 | Goetz |
| 2014/0074790 | A1 | 3/2014 | Berman |
| 2014/0173035 | A1 | 6/2014 | Kan |
| 2014/0215129 | A1* | 7/2014 | Kuzmin ............... G06F 12/0246 711/103 |
| 2015/0058293 | A1 | 2/2015 | Kobayashi |
| 2016/0357791 | A1 | 12/2016 | Levandoski |

OTHER PUBLICATIONS

Laurent Baduel et al., "Programming, Composing, Deploying for the Grid", Grid Computing: Software Environments and Tools, Springer, 30 pages, retrieved Jan. 21, 2016 from: <https://hal.inria.fr/inria-00486114/document>.

David Wong et al., "Java-based Mobile Agents", Communications of the ACM, Mar. 1999, vol. 42. No. 3, 11 pages.

* cited by examiner

SYSTEM AND METHOD FOR RARE COPY-ON-WRITE IN A DISTRIBUTED COMPUTING ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application is a continuation of U.S. patent application Ser. No. 15/200,908, entitled "SYSTEM AND METHOD FOR RARE COPY-ON-WRITE IN A DISTRIBUTED COMPUTING ENVIRONMENT", filed Jul. 1, 2016, and which claims the benefit of priority to U.S. Provisional Patent Application No. 62/187,538, entitled "SYSTEM AND METHOD FOR RARE COPY-ON-WRITE IN A DISTRIBUTED COMPUTING ENVIRONMENT" filed Jul. 1, 2015 which applications are incorporated herein by reference.

FIELD OF INVENTION

The present invention is generally related to computer systems, and more particularly to a distributed computing environment.

SUMMARY

To enhance performance of a distributed data grid it is desirable to minimize overhead associated with reading and/or writing data. In a conventional system a request to access data implements an exclusive lock on the date. After the request (read or write) has been executed against the data, the lock is released and another request can be executed against the data. The exclusive lock ensures that only one task at a time can access a data resource thus ensuring a consistent view of the data. The conventional model incurs substantial overhead for every transaction in obtaining and releasing locks and is a source of contention in that only one request at a time can access the data.

Where a data structure is read heavy for multiple threads, it is more efficient to access it without any synchronization (locks at all) so there is no contention. Read requests, by definition, do not mutate the data and thus synchronization is not a concern because the data does not change during read-only access. However, then when one of the threads wants to make a mutation (execute a write request), the thread must take out a lock, copy the read-only data that all the other threads were reading, mutate the copy, and then replace the read only copy with the new/mutated data. This copy-on-write (COW) model is a conventional way of making a data structure that is mostly read only concurrent.

In the copy-on-write model, it is not necessary to create or lock separate copies for each task where the tasks only require read access to the data. Each read task can be given pointers to the same resource. This reduces overhead because it avoids lock creation for each read task. However when a task needs to modify the data (e.g., perform a write), a local copy of the data must be created on which to perform the modification. The original resource remains unchanged until the modified data is written over it. The COW process has significantly higher overhead for writes than the conventional read/write model. However, in situations where writes are very rare the reduction in overhead for the large volume of read transactions exceeds the additional overhead for COW for the rare write operations.

However, in a distributed data grid, a common data access pattern is that the particular data goes through active and dormant phases. In active phases, a number of write transactions may be performed against the data in a short period of time. In dormant phases the data is not mutated and only read transactions are performed against the data. Thus, the write activity is bursty. If the distributed data grid utilizes a conventional read/write data access pattern then it incurs unnecessary overhead during dormant phases where data access is almost entirely read-only. Conversely, if the distributed data grid utilizes a COW data access pattern then it incurs unnecessary overhead during active phases where write transaction are performed.

Thus the present disclosure describes a rare copy-on-write (rare COW) model which minimizes the overhead for a data structure that is mostly read only, but that sometimes goes into periods where writes are actually heavy. Rare COW optimizes out the cost of the copy, which can be quite expensive if done frequently, or if a single copy is very expensive in terms of overhead (large data items). Rare COW reduces the number of copies made when utilizing a COW pattern. Rare COW can thus reduce overhead and increase performance of the distributed data grid as to either of the read/write or COW models alone when faced with read-heavy data access pattern with bursty write periods.

These and other objects and advantages of the present invention will become apparent to those skilled in the art from the following description of the various embodiments, when read in light of the accompanying drawings.

DETAILED DESCRIPTION

Figure 1:
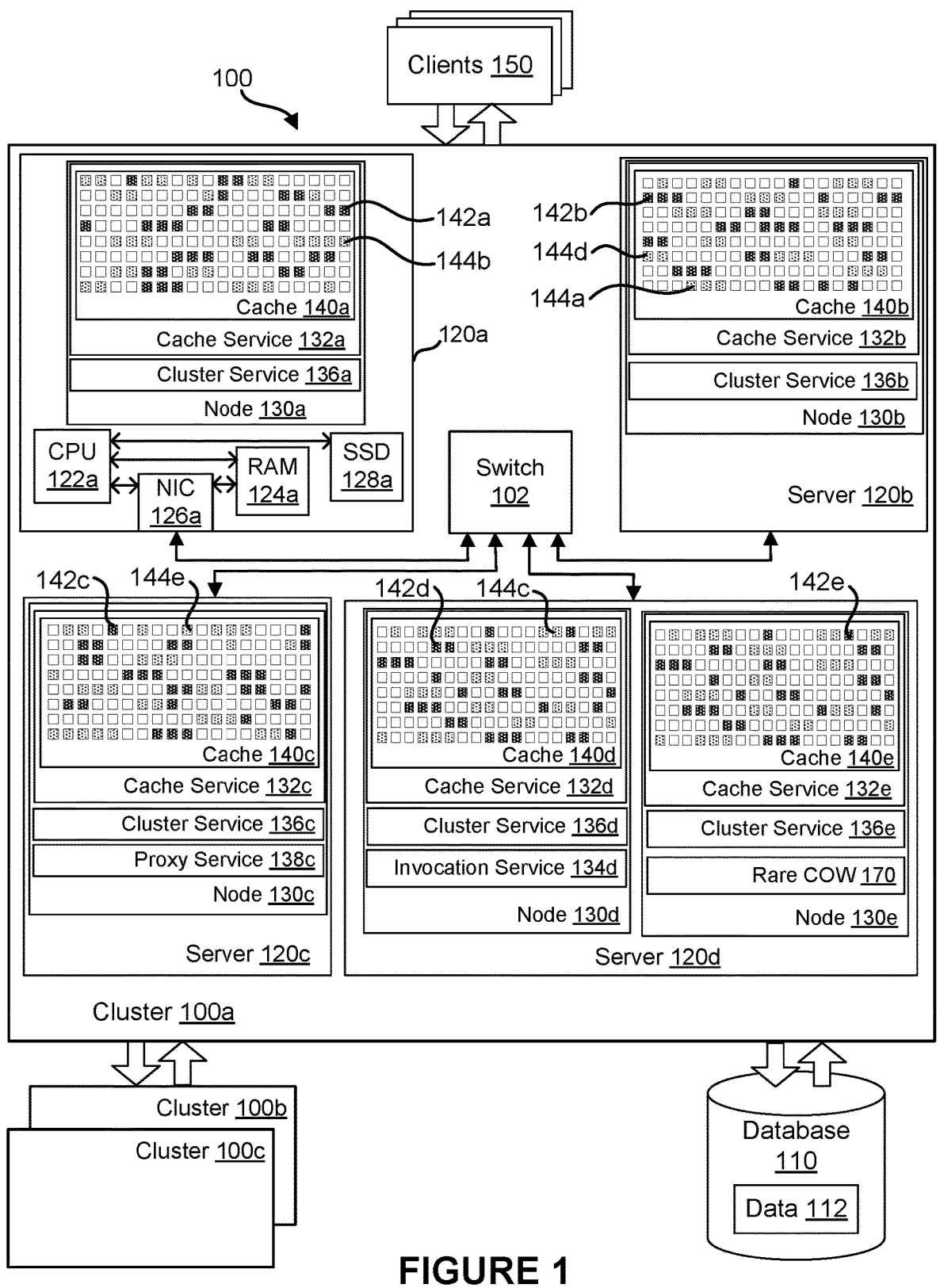
FIG. 1 illustrates a distributed data grid implementing rare copy-on-write functionality, according to an embodiment of the invention.

Described herein are a system and method for rare copy-on-write in a distributed computing environment. The systems and methods for supporting rare copy-on-write functionality as described herein have particular utility in the distributed data grid described below with respect to FIG. 1. The systems and methods for supporting dynamic deployment of executable code with multi-version control may also be applied in wide variety of alternative distributed computing environments.

In accordance with embodiments of the present invention, the distributed data grid uses a rare COW hybrid data access model which utilize aspects of conventional read/write/lock data access during active phases and COW during dormant phases. The distributed data grid monitors data access workload to determine which data access model is appropriate for particular data during a particular period of time. By selecting features of the different data access models as appropriate during a particular period of time, the distributed data grid can reduce overhead for data access as compared to using one or the models at all times.

In accordance with embodiment of the invention, a distributed computing environment is provided with a system and method for supporting rare copy-on-write data access. The system operates a data structure in a read only pattern suitable for serving a plurality of read requests with reduced overhead. The system, upon receiving a write request, creates a copy of data to execute the write request. The system defers writing the mutated data back to the read-only data structure. The system thus allows for multiple mutations to be made to the copy of the data using a read/write access pattern. After a number of read-only requests are received, the mutated data is written back to the read-only data structure. A monitor counts read and write requests in order to reduce overall read/write overhead and enhance performance of the distributed data grid.

In accordance with an embodiment, the present invention thus provides a system and method for supporting rare copy-on-write in a distributed computing environment such as a distributed data grid. In accordance with an embodiment, a method can begin with operating a data grid in a read-only optimized data access pattern (e.g. COW), the data grid receiving a plurality of read requests. The method can further, upon receiving one or more write requests, switch the operation of the data grid to a read/write optimized data access pattern (e.g. conventional read/write/lock data access) with respect to copied data. The method can conclude with determining, based upon receiving a number of read requests, to write the mutated copied data back to the read-only data structure for read-only access.

In accordance with embodiments of the present invention, a monitor is provided which examines the relative number of read requests and write requests during periods of time in order to determine whether a read-only data access pattern (COW) or conventional read/write data access pattern would have the least overhead during the present period of time. The selection of data access model is dynamic and responsive to actual data usage thereby reducing overhead associated with data access and enhancing performance of the distributed data grid.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Data Grid

A "distributed data grid" or "data grid cluster" is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computationally intensive, stateful, middle-tier applications. In particular examples, distributed data grids, such as e.g., the Oracle® Coherence data grid, store information in-memory to achieve higher performance, and employ redundancy in keeping copies of the information synchronized across multiple servers, thus ensuring resiliency of the system and continued availability of the data in the event of failure of a computer server in the cluster.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described herein, without departing from the scope of the invention.

FIG. 1 shows an example of a distributed data grid 100 which stores data and provides data access to clients 150. Distributed data grid 100 is a system comprising a plurality of computer servers (e.g., 120*a*, 120*b*, 120*c*, and 120*d*) which work together in one or more cluster (e.g., 100*a*, 100*b*, 100*c*) to store and manage information and related operations, such as computations, within a distributed or clustered environment. While distributed data grid 100 is illustrated as comprising four servers 120*a*, 120*b*, 120*c*, 120*d*, with five data nodes 130*a*, 130*b*, 130*c*, 130*d*, and 130*e* in a cluster 100*a*, the distributed data grid 100 may comprise any number of clusters and any number of servers and/or nodes in each cluster.

Distributed data grid 100 stores information in-memory (for example in the RAM of each data node) to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1, distributed data grid 100 provides data storage and management capabilities by distributing data over a number of computer servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more.

Server 120a of FIG. 1, is illustrated as having CPU 122a, Memory 124a and NIC 126a (these elements are also present, but not shown, in each of the other Servers 120b, 120c, 120d and servers, not shown, of additional clusters). Optionally each server may also be provided with flash memory—e.g. SSD 128a—to provide spillover storage capacity. When provided, the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better). The servers and clusters can be networked using for example high performance Ethernet or InfiniBand™ networks.

A cluster 100a preferably contains a minimum of four physical servers to avoid the possibility of data loss during a failure, but a typical installation has many more than four servers per cluster. Failover and failback are more efficient when more servers are present in each cluster and the impact of a server failure on a cluster is lessened. To minimize communication time between servers, each data grid cluster is ideally confined to a single switch 102 which provides single hop communication between all of the servers. A cluster may thus be limited by the number of ports on the switch 102. A typical cluster will therefore include between 4 and 96 physical servers networked using a single switch.

In most Wide Area Network (WAN) implementations of a distributed data grid 100, each data center in the WAN has independent, but interconnected, data grid clusters (e.g., 100a, 100b, and 100c). A WAN may, for example, include many more clusters than shown in FIG. 1. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid, the nodes may be for example, software applications, virtual machines, or the like and the servers may comprise an operating system, hypervisor or the like (not shown) on which the node operates. In an Oracle® Coherence data grid, each node is Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the services provided on nodes of the distributed data grid include, for example, the cluster service, the proxy service, the invocation service, and distributed cache service. The cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster. Although shown on only one node each, the invocation service and proxy service can be configured on any number up to all of the nodes of the distributed data grid.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. instances of the distributed cache service operating on each of the nodes manage distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that clients 150 and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand™.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128*a*), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 128*a*) while having the index/memory tree stored in memory (e.g. RAM 124*a*). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications read and write data to and from the data grid, avoiding expensive requests to back-end data sources such as databases. The shared data cache provides a single, consistent view of cached data. Reading from the cache is faster than querying back-end data sources and scales naturally with the application tier. In-memory data storage alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

To enhance performance of a distributed data grid it is desirable to minimize overhead associated with reading and/or writing data. In accordance with embodiments of the present invention, the distributed data grid 100 utilizes a rare COW hybrid data access model 170 on some or all nodes of the distributed data grid. The rare COW hybrid data access model utilizes aspects of conventional read/write/lock data access during active phases and COW during dormant phases. The distributed data grid monitors data access workload to determine which data access model is appropriate for particular data during a particular period of time. By selecting features of the different data access models as appropriate during a particular period of time, the distributed data grid can reduce overhead for data access as compared to using one or the models at all times thereby improving performance of the distributed data grid 100.

Rare Copy-on-Write

Copy-on-write (referred to herein variously as "COW") is an optimization strategy for enhancing performance of distributed data access in, for example, a distributed data grid. Copy-on-write stems from the understanding that when multiple separate tasks use initially identical copies of some information (e.g., data stored in computer memory or disk storage), treating the information as local data that the tasks may occasionally need to modify, then it is not necessary to immediately create separate copies of that information for each task. Instead each task can be given pointers to the same resource. This reduces overhead because it avoids the creation of separate copies of the data for access by each task. However the use of COW depends on the provision that on the first occasion where the tasks need to modify the data (e.g., perform a write), a local copy is be created on which to perform the modification (the original resource remains unchanged). This is in essence a lock. When there are many separate processes all using the same resource, each with a small likelihood of modifying the resource, then it is possible to make significant resource savings by sharing resources using COW. Copy-on-write dictates whenever a task attempts to make a change to the shared information, a lock is first created, and then once the change has been finalized, the information is copied back onto the read-only copy.

A COW pattern is useful when a data structure is read heavy for multiple threads. In such situations, it is more efficient to access the data structure without any synchronization at all, so there is little to no contention. However, when one of the threads wants to make a mutation or a change to the read only-copy, a lock can be taken out so that the task can copy the read only copy that all the other threads were reading, mutate/change the copy, and then replace the read only copy with a new read only copy. COW is useful when a data structure is primarily read only with only occasional writes as COW is fast and inexpensive and the rare write operation (while expensive) occurs infrequently.

However, COW is not necessarily the most efficient pattern for data structures that can go into periods where writes are heavy, but that sometimes it may go into periods where read only is prevalent. If COW is utilized in situations, where write/mutations are prevalent for periods of time, the COW process can get expensive quickly. If COW is used in write heavy situations, the additional overhead induced by making a copy, modifying the copy, and the writing the modified copy back for each write becomes expensive as compared to merely locking the original data and performing a write to the original data. The write procedure in the COW process is significantly more expensive than the write procedure in a conventional read/write data access pattern.

Thus, when designing a distributed data structure, one can chose a COW solution if the data structure will be used mostly for read-only operations or one can choses a conventional read/write pattern with locking if the data structure will have significant write operations. However, in applications of the distributed data grid, there is often data that is used in a read-only manner for significant periods of time and then enters short active periods in which write transactions are performed requiring changes to the data. Thus, during different periods a different choice of COW or conventional read/write pattern with locking is the better solution.

The present disclosure describes a rare copy-on-write (rare COW) model which minimizes the overhead for a data structure that is mostly read only, but that sometimes may go into periods where writes are frequent. Rare COW optimizes out the cost of the copy, which can be quite expensive if done frequently, or if the copy is large. For example, imagine you have a data structure like a map with a million items in it, if you go to make a change to one of the items, you have to copy a million items, this incurs significant overhead, it would have been better to use locking instead of a read-only data structure. In the rare COW data access model, the data structure is treated as read only, but when a mutation happens, a copy is made for COW. However, instead of writing the mutated copy back into read-only mode, the rare COW model leaves the data in read-write mode which requires locking for some period of time following the first write. This allows a number of mutations to the data to be made without the overhead of additional copies. Only after a number of read-only requests are submitted will the system determine that shedding the locks is worthwhile and transition back to full read only, with no locking. Having returned to COW another subsequent write will again force the copy. The system takes into account both the number of read-requests received and also the overhead of making a copy of the particular data.

The rare COW system enhances the value of the copy which can be quite expensive if done frequently, by allowing multiple successive mutations to be made to a single copy. Thus the rare COW model makes fewer copies of data than the conventional COW model. In a rare COW pattern, a data structure can be treated, for the most part, as read only and utilize the COW solution. However, during in active period when writes/changes are prevalent the system can switch, for a time, to the more conventional read/write pattern with respect to the copy made. Subsequently, when the system determines that enough reads have come in, and writes are slowing down, and shedding the locks appears to be worthwhile, the system can revert back to full read only COW, with no locking. Thus the rare COW feature allows the system to tune the data access solution based upon the variable workload thereby reducing overhead and increasing performance in the distributed data grid.

In accordance with an embodiment, when the system is read heavy, rare COW provides the benefit of copy-on-write, which limits contention and optimizes expenses. As well, with rare COW, if the system is experiencing frequent writes, then the system can have the performance of a standard (e.g., read/write) synchronized implementation, and if there is something in the middle (long reads, sporadic writes) then the system can select between the two solutions (read/write and COW) based on the prevalent task type. The switching between a read-only COW pattern and a read/write locking pattern can be, at least in part, based upon a comparison of the reads and writes over a predetermined or dynamic time period.

In accordance with an embodiment, within rare COW, a write lock implementation can be always real, thus any mutating operation can take out a real write lock. The read lock implementation can be changed over the lifetime of the data structure. It can either be a read read-lock, i.e., one which will contend, or it can be a null-lock implementation which can be a fake lock which does nothing and thus does not contend. If the read-to-write ratio is high enough, the pattern can drop its read lock and swap in a null-lock. This allows subsequent reads to be non-contending. Any subsequent mutation can take out the real write-lock and then check to see if the corresponding read-lock is a null-lock or not. If it is a null-lock, then there can be unknown reads concurrently working on the data structure, and thus a full copy can be made and the real read-lock is restored. This leaves the data structure in a read/write. If upon a write it is found that the read-lock is not a null lock, then no copy needs to be made as threads concurrently trying to read from the data structure would have to acquire the real read lock, and would be blocked.

Figure 2:
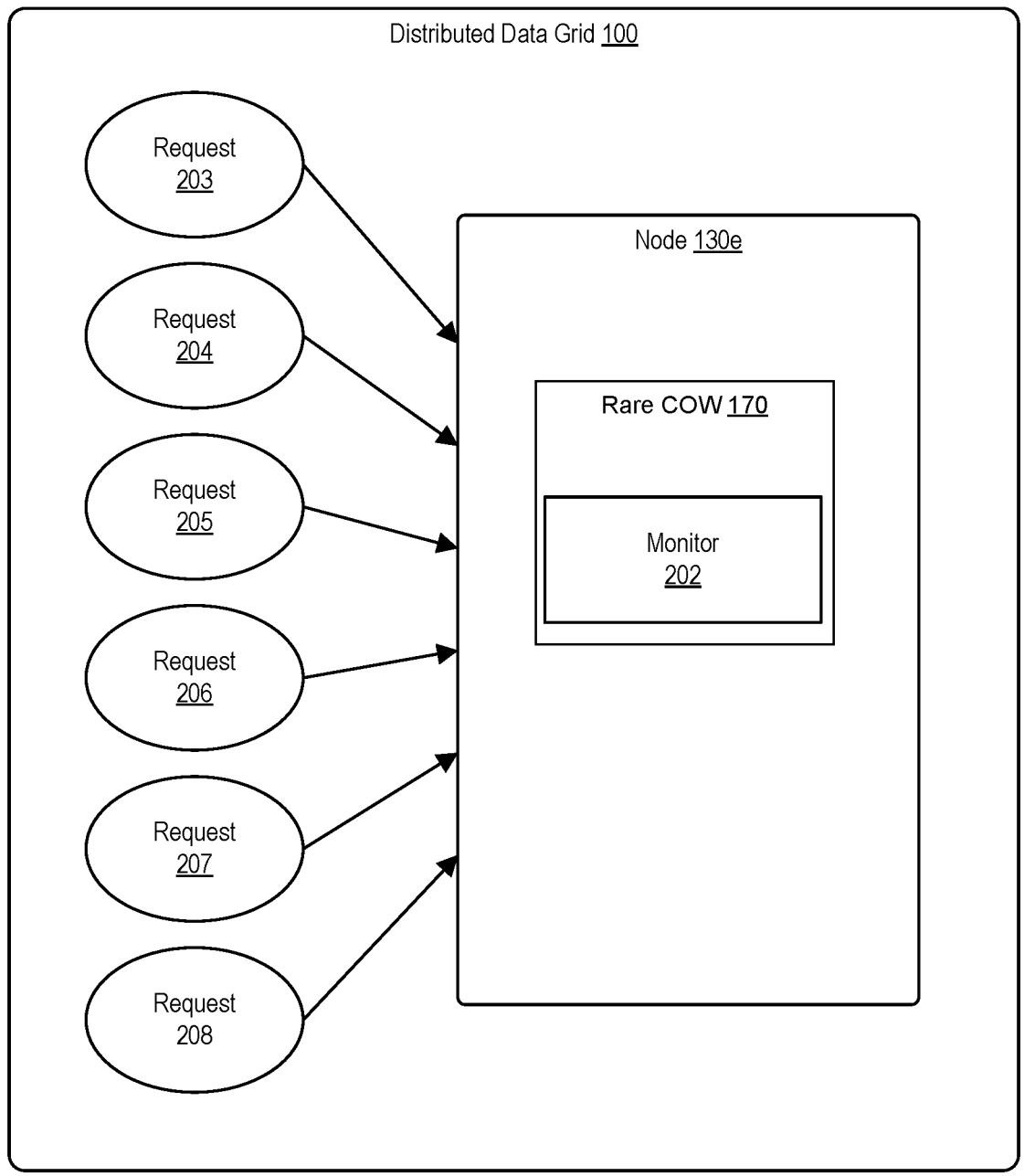
FIG. 2 illustrates a rare copy-on-write mechanism for implementation in a distributed computing environment, according to an embodiment of the invention.

FIG. 2 illustrates an overview of supporting rare copy-on-write in a distributed computing environment such as distributed data grid 100, according to an embodiment. A node 131e implementing rare copy-on-write function 170 includes a monitor 202, and receives multiple requests 203-208. The requests can be either a read or a read/write request, depending upon the circumstance. The node 130e can be operating under a rare COW pattern, wherein the node operates in a read-only pattern while receiving only read requests until such time as the node starts receiving one or more read/write requests. The read-only pattern has reduced overhead and is advantageous where the most of the requests are read requests.

Once the node 130e receives a read/write request, the node can turn on a lock and operate in a read/write (e.g., normal) mode, allowing the read/write request to modify/change the data within the node. Because the node is operating under a rare COW pattern, the monitor 202 monitors the incoming requests 203-208 to determine when to switch the data grid 101 back to a read only pattern. This can happen, for example, when the number of read-only requests increases or when the number of read/write requests decreases.

The monitor 202 examines the relative number of read requests and write requests during periods of time in order to determine whether a read-only data access pattern (COW) or conventional read/write data access pattern would have the least overhead during the present period of time. The selection of data access model is dynamic and responsive to actual data usage thereby reducing overhead associated with data access and enhancing performance of the distributed data grid.

Figure 3:
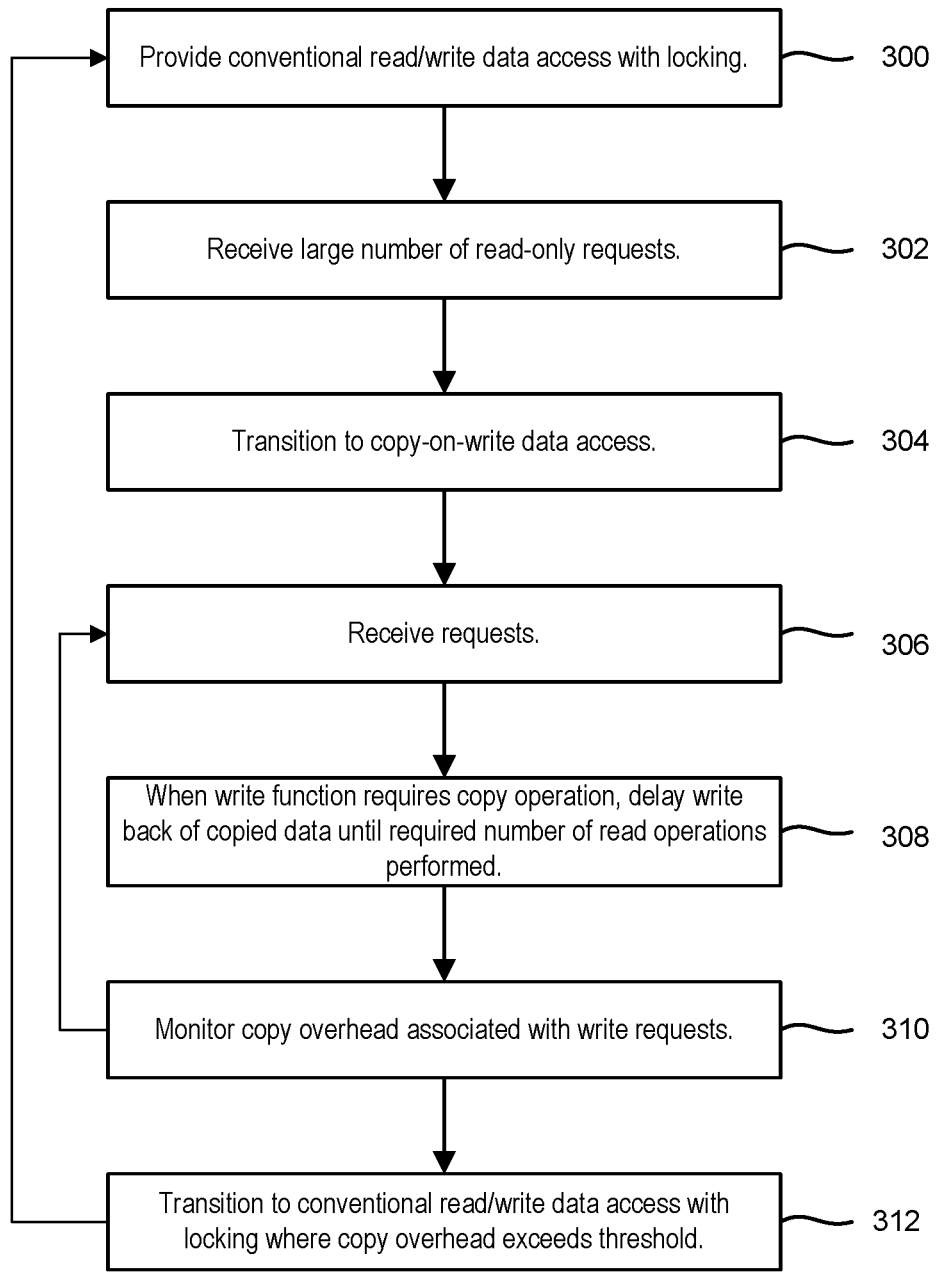
FIG. 3 illustrates operation of rare copy-on-write according to an embodiment of the invention.

FIG. 3 illustrates operation of rare copy-on-write according to an embodiment of the invention. As shown in FIG. 3, at step 300 a data structure (for example a long array is provided. Initially, a conventional read write data access regime with locking is utilized for the data structure. The request traffic to the data structure is monitored. If large numbers of read-only requests are received, step 302, then the system makes a determination to transition to COW data access, step 304. Request are received in COW mode step 306. If write requests are received while in COW mode, write back of the copied data is deferred until a required number of read-only request have been received for the data. Thus the particular data is accessed using locking until it enters a passive phase in which no write requests are being received. While in COW mode, the monitor also monitors request traffic, step 310, in order to determine copy overhead associated with write requests—the copy overhead takes into account the number of write requests and size of the copies required for the write requests. At step 312, if the copy overhead exceeds an overhead threshold, it is determined that the data structure should utilize conventional read write data access regime with locking (step 300).

In an embodiment, the rare COW functionality can be implemented in the JAVA programming language as a thread-safe LongArray implementation of a data structure. The LongArray implementation of rare COW is suitable for read heavy workloads but is also efficient with frequent and/or bursty writes by utilizing the rare COW mechanism. Thread-safety is supported via a combination of locking (during active periods when writes are prevalent) and copy-on-write (during read heavy periods). When the read to write ratio is high enough (think thousands of reads per write) the read locks will be elided and thread safety is achieved with COW allowing for maximum performance. The implementation allows for many mutations within a single copy during COW before writing the copy back to the read-only data structure. For workloads with a read to write ratio close to 1:1, or where writes are more common than reads, a conventional SafeLongArray which supports thread safety using locking in the conventional manner is more appropriate.

A tunable variable is used to define the assumed relative cost of cloning (copying) an element in the LongArray relative to doing a LongArray.get( ). The tunable variable reflects the relative overhead of COW writes compared to a conventional read/write transaction. The value of the variable ultimately dictates how many read operations must be performed against a read/write array before it is considered worth it to switch to read-only mode. Once in read-only mode any writes will force a potentially very expensive copy (COW). The monitor maintains a count of read requests made in read/write mode. The monitor compares the count to a threshold which triggers transition to the read-only mode (i.e. copies the mutated data back to the read-only data structure) when the threshold is exceed. The trigger threshold depends on the relative cloning cost and the overhead for a particular copy operation (array size).

EXAMPLE RARE COW IMPLEMENTATION

The following illustrates an implementation of the rare COW functionality in a Read Heavy Long Array class. As shown, the following code constructs a ReadHeavyLongArray around a specified delegate. The data structure is initialized in read write mode with locking for read and write access. When the read count gets sufficiently high the data structure transitions to a lock free mode which necessitates copy on write. During copy on write data is cloned for write operations and maintained in read-write mode with locking until sufficient reads have been received. Note that each time a write is received during this period the number of reads required is pushed out. After sufficient reads have been received since the last write, the mutated copy is written back to the lock-free data structure. At this point another write will necessitate another copy operation.

The following code constructs a ReadHeavyLongArray around a specified delegate.

```
public class ReadHeavyLongArray<V>
    extends AbstractSafeLongArray<V>
{
    /**
     * Construct a ReadHeavyLongArray.
     */
    public ReadHeavyLongArray( )
    {
        this(new SparseArray<V>( ));
    }
    /**
     * Construct a ReadHeavyLongArray around the specified delegate.
     *
     * @param delegate the delegate long array, it is not safe to externally access this array
     */
    public ReadHeavyLongArray(LongArray<V> delegate)
    {
        // start in read/write mode
        ReentrantReadWriteLock lock = new ReentrantReadWriteLock( );
        m_laDelegate = delegate;
        f_lockReadRaw = lock.readLock( );
        m_lockRead = new AutoLock<>(f_lockReadRaw, delegate);
        f_lockWrite = new AutoLock<LongArray<V>>(lock.writeLock( ))
            {
            @Override
            public LongArray<V> getResource( )
                {
                return m_laDelegate; // always return updated resource, never a snapshot
                }
            };
    }
```

The following code provides interfaces for the ReadHeavyLongArray. Note that it is not recommended that public lock accessors be exposed as their usage is quite specific. Holding the lock all access to the LongArray must be from the lock's getResource( ) method because any access to this LongArray even while holding the lock may not be safe as often times the getResource( ) actually refers to a snapshot/copy. As shown, access via the interface transitions from lock-free reads to locked reads after making a copy in case there are concurrent readers now. Also, upon subsequent writes to the copy, the threshold for transitioning back to lock-free reads is pushed back.

```
@Override
public ReadHeavyLongArray<V> clone( )
    {
    try (Sentry<LongArray<V>> sentry = acquireReadLock( ))
        {
        return new ReadHeavyLongArray<>(sentry.getResource( ).clone( ));
        }
    }
```

```
// -----AbstractSafeLongArray interface -------------------------------
//
@Override
protected Sentry<LongArray<V>> acquireWriteLock( )
    {
    Sentry<LongArray<V>> sentry   = f_lockWrite.acquire( );
    LongArray<V>         delegate = sentry.getResource( );
    if (m_lockRead instanceof NullLock)
        {
        // transition from lock-free reads; to locked reads after making a copy in case there are
concurrent readers now
        delegate = delegate.clone( );
        m_laDelegate = delegate; // ensures that even this write locks's sentry will return the new
clone
        m_lockRead = new AutoLock<>(f_lockReadRaw, delegate);
        }
    // else; already using lock-based readers for this delegate
    // each time we do a write we need to push out the read trigger
    m_cReadTrigger = m_cReads + delegate.getSize( ) * CLONE_COST_MULTIPLIER;
    return sentry;
    }
@Override
protected SafeIterator instantiateSafeIterator(final boolean fForward, final long lIndexFrom)
    {
    try (Sentry<LongArray<V>> sentry = acquireReadLock( ))
        {
        final LongArray<V> laDelegateStart = sentry.getResource( );
        return new SafeIterator(laDelegateStart, fForward, lIndexFrom)
            {
            @Override
            public V setValue(V oValue)
                {
                V valueOld;
                try (Sentry<LongArray<V>> sentry = acquireWriteLock( ))
                    {
                    LongArray<V> laDelegateCurr = sentry.getResource( );
                    if (laDelegateStart == laDelegateCurr)
                        {
                        valueOld = f_delegate.setValue(oValue);
                        }
                    else
                        {
                        // we're iterating an old version, perform operation against the current delegate
array
                        valueOld = laDelegateCurrset(getIndex( ), oValue);
                        }
                    }
                m_valueLast = oValue;
                return valueOld;
                }
            @Override
            public void remove( )
                {
                try (Sentry<LongArray<V>> sentry = acquireWriteLock( ))
                    {
                    LongArray<V> laDelegateCurr = sentry.getResource( );
                    if (laDelegateStart == laDelegateCurr)
                        {
                        f_delegate.remove( );
                        }
                    else
                        {
                        // we're iterating an old version, perform operation against the current delegate
array
                        laDelegateCurr.remove(getIndex( ));
                        }
                    m_valueLast = NO_VALUE;
                    }
                }
            };
        }
    }
```

The ReadHeavyLongArray implementation in this example uses a number of constants, data members and variables.

Private static final int CLONE_COST_MULTIPLIER=1000; represents the assumed relative cost of cloning an element in the LongArray relative to doing a LongArray.get( ). This value ultimately dictates how many read operations must be performed against a read/write array before it is considered advantageous to switch to read-only mode. Once in read-only mode any writes will force a potentially very expensive copy. The actual value can be tuned to optimize performance of the system.

Protected long m_cReads; is the monitored number of read requests as modified e.g. by being pushed back in response to write requests. I.E., the (dirty) total number of reads.

Protected long m_cReadTrigger; represents the (dirty) read count at which to trigger a switch to a lock-free delegate.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting efficient data access in a distributed computing environment comprising a clustered plurality of nodes, the method comprising:
providing a data structure on each node of the plurality of nodes in the distributed computing environment wherein the data structure is configured for read-only access to reduce data access overhead and improve performance of the distributed computing environment;
serving a plurality of read requests for a particular data object from the data structure on a particular node of the plurality of nodes;
in response to a write request for the particular data object, creating, on said particular node, external to said data structure, a copy of the particular data object from the data structure in response to a write request to modify said particular data object;
modifying, on said particular node, said copy of said particular data object in response to said write request to generate a modified data object external to said data structure;
providing, on said particular node, read and write access to said modified data object external to said data structure including serving one or more write requests and a plurality of read requests using said modified data object external to said data structure;
maintaining a count of read requests received for the modified data object and resetting the count of read requests each time a write request is received for the modified data object; and
writing said modified data object back to said data structure on said particular node when said count of read requests for said modified data object reaches a threshold number.

2. The method of claim 1, further comprising:
determining said threshold number based at least in part on the overhead associated with copying said particular data object.

3. The method of claim 1, further comprising:
eliding read locks on said data structure in response to a ratio of read requests compared to write requests greater than 1000:1.

4. The method of claim 1, wherein a plurality of write requests are served using said modified data object before writing the modified data object back to said data structure.

5. The method of claim 1, further comprising:
determining said threshold number using a tunable variable based at least in part on the overhead associated with copying said particular data object.

6. The method of claim 1, further comprising:
monitoring, on said particular node, a count of read requests received while providing read and write access to said modified data object.

7. The method of claim 1, further comprising:
initially implementing a real read lock in said data structure and then transitioning to a non-contending null-lock.

8. The method of claim 1, wherein:
the data structure implements non-contending null-lock during read-only access.

9. The method of claim 1, wherein the distributed computing environment is a distributed data grid implementing a distributed in-memory cache comprising said data structure.

10. A system support efficient data access in a distributed computing environment comprising a clustered plurality of nodes, each node comprising:
a computer server comprising a microprocessor and a memory;
a data structure operating on the computer server wherein the data structure is configured for read-only access to reduce data access overhead and improve performance of the distributed computing environment;
wherein the data structure is configured to,
serve a plurality of read requests for a particular data object from the data structure on said computer server,
create, on said computer server, external to said data structure, a copy of particular data object from the data structure in response to a write request to modify said particular data object,
modify, on said computer server, said copy of said particular data object in response to said write request to generate a modified data object external to said data structure,
provide, on said computer server, read and write access to said modified data object external to said data structure, including serving one or more write requests and a plurality of read requests using said modified data object external to said data structure, maintain a count of read requests received for the modified data object and resetting the count of read requests each time a write request is received for the modified data object, and write said modified data object back to said data structure on said computer server when said count of read requests received for said modified data object reaches a threshold number.

11. The system of claim 10, wherein the data structure is further configured to:

determine said threshold number based at least in part on the overhead associated with copying said particular data object.

12. The system of claim 10, wherein the data structure is further configured to:

elide read locks on said data structure in response to a ratio of read requests compared to write requests greater than 1000:1.

13. The system of claim 10, wherein a plurality of write requests are served using said modified data object before writing the modified data object back to said data structure.

14. The system of claim 10, wherein the data structure is further configured to:

determine, on said computer server, said threshold number using a tunable variable based at least in part on the overhead associated with copying said particular data object.

15. The system of claim 11, wherein the data structure is further configured to:

monitor, on said computer server, a count of read requests received while providing read and write access to said modified data object and reset the count of read requests to zero when a write request is received for said modified data object.

16. The system of claim 11, wherein the data structure is further configured to:

initially implement a real read lock in said data structure and then transition to a non-contending null-lock.

17. The system of claim 11, wherein:

the distributed computing environment is a distributed data grid implementing a distributed in-memory cache comprising said data structure.

18. A non-transitory computer-readable medium including instructions stored thereon for supporting efficient data access in a distributed computing environment, which instructions, when executed on a node of the distributed computing environment, cause the node to perform steps comprising:

providing a data structure on said node in the distributed computing environment wherein the data structure is configured for read-only access to reduce data access overhead and improve performance of the distributed computing environment;

serving, on said node, a plurality of read requests for a particular data object from the data structure;

creating, on said node, external to said data structure, a copy of the particular data object from the data structure in response to a write request to modify said particular data object;

modifying, on said node, said copy of said particular data object in response to said write request to create a modified data object external to said data structure;

providing read and write access to said modified data object on said node external to said data structure, including serving one or more write requests and a plurality of read requests using said modified data object external to said data structure;

maintaining a count of read requests received for the modified data object and resetting the count of read requests each time a write request is received for the modified data object; and writing said modified data object back to said data structure on said node when said count of read requests for said modified data object reaches a threshold number.

* * * * *